(12) United States Patent
Kamdar et al.

(10) Patent No.: US 7,340,212 B2
(45) Date of Patent: Mar. 4, 2008

(54) METHOD AND SYSTEM FOR DELIVERY OF LOCATION-SPECIFIC DATA USING DIGITAL SATELLITE BROADCAST

(75) Inventors: Hitan S. Kamdar, Utica, MI (US); Russell A. Patenaude, Macomb Township, MI (US); Anthony J. Sumcad, Southfield, MI (US); Shpetim S. Veliu, Livonia, MI (US); Brad T. Reeser, Lake Orion, MI (US); Mingheng Wang, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 792 days.

(21) Appl. No.: 10/870,741

(22) Filed: Jun. 17, 2004

(65) Prior Publication Data

US 2005/0282489 A1    Dec. 22, 2005

(51) Int. Cl.
*H04D 7/20*    (2006.01)
(52) U.S. Cl. .................. 455/3.02; 455/3.01; 455/3.03; 455/3.04; 455/3.06; 455/414.1; 455/414.2; 455/422.1; 342/357.01; 342/357.06; 342/357.12; 342/357.13; 725/63; 725/64; 725/68; 701/213; 701/207

(58) Field of Classification Search .............. 455/3.01, 455/3.02, 3.03, 3.04, 3.06, 414.1, 414.2, 455/414.3, 414.4, 418, 419, 420, 427, 428, 455/429, 500, 517, 456.1, 456.2, 456.3, 456.6, 455/550.1; 342/357.01, 357.06, 357.09, 342/357.12, 357.13; 725/63, 64, 68, 71; 701/213, 207
See application file for complete search history.

(56) References Cited

U.S. PATENT DOCUMENTS

| | | | |
|---|---|---|---|
| 6,643,587 B2 | 11/2003 | Brodie | |
| 2002/0183059 A1* | 12/2002 | Noreen et al. | .............. 455/427 |
| 2003/0216120 A1* | 11/2003 | Cersoli et al. | ............. 455/3.02 |
| 2004/0198282 A1* | 10/2004 | Heiderscheit et al. | .... 455/186.1 |
| 2005/0251455 A1* | 11/2005 | Boesen | ........................ 705/26 |

* cited by examiner

*Primary Examiner*—Keith Ferguson

(57) ABSTRACT

A method and system for location-specific delivery of digital satellite broadcast data comprising determining a current service location, selecting a satellite radio band based on the determination, monitoring the selected satellite radio band for a data package, and initiating reception of the data package at the mobile device using the determined satellite radio band. A computer usable medium with suitable computer program code is employed for location-specific delivery of digital satellite broadcast data.

20 Claims, 2 Drawing Sheets

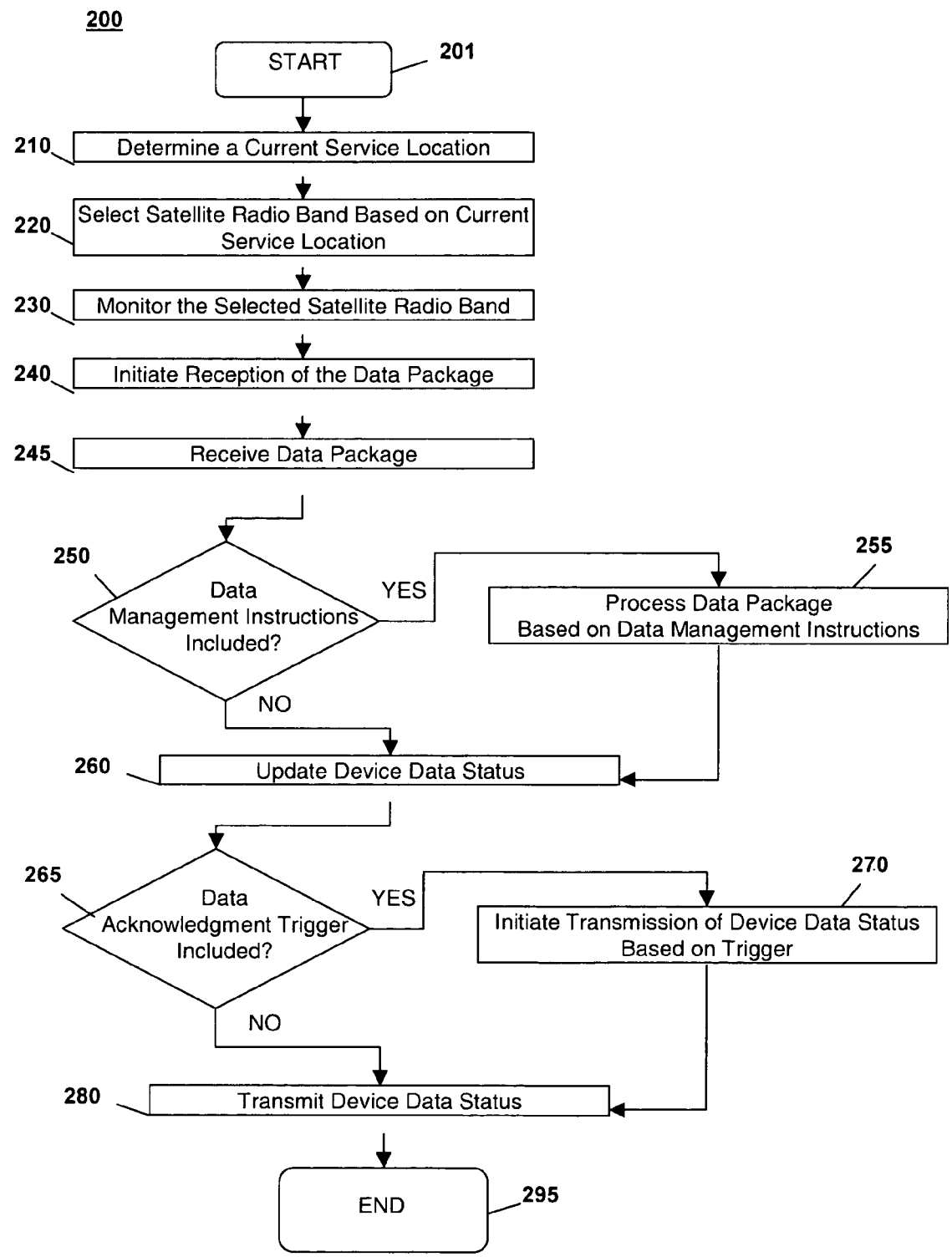

METHOD AND SYSTEM FOR DELIVERY OF LOCATION-SPECIFIC DATA USING DIGITAL SATELLITE BROADCAST

FIELD OF THE INVENTION

This invention relates generally to delivery of satellite broadcast data. In particular, the invention relates to delivery of location-specific data using digital satellite broadcast.

BACKGROUND OF THE INVENTION

Currently many updates to mobile devices such as telematics units are accomplished by over-the-air service provisioning (OTASP). However, OTASP requires use of the wireless network, running the risk of imposing on revenue-bearing network activity.

Certain preferences, such as preferred roaming lists, are constantly changing as provider relationships change or new roaming agreements are made. The service provider must have a method for updating such data to reflect new preferences without disturbing subscribers Some data updates require the customer to initiate a request for an update. Some updates are location specific and require conversation between the provider and the subscriber to assure accurate data updates. Activity that occurs in the background allows for dynamic updates and limits the need for any intervention. For example, taking control of roaming calls made by subscribers allows a reduction in costs and an increase in margins. By doing so, it is easy to redirect traffic when new networks are added to a group, or when new roaming agreements are made.

The data broadcast capability of digital satellite radio is an efficient method for distributing data to mobile vehicles. Satellite broadcast of data content eliminates the need for establishing a cellular data connection between the mobile vehicle and the telematics service provider. Due to the broadcast nature of digital satellites, two-way data communication is not possible. When data content is broadcast to a mobile vehicle, the receipt and processing of that data content cannot be confirmed automatically. The telematics service provider must contact the mobile vehicle directly to determine the success or failure of the data content delivery and processing.

It is therefore desirable to provide a system and method for remotely programming and testing cellular network integrity using telematics that overcomes the limitations, challenges, and obstacles described above.

SUMMARY OF THE INVENTION

One aspect of the present invention provides a method for location-specific delivery of digital satellite broadcast data, comprising determining a current service location, selecting a satellite radio band based on the determination, monitoring the selected satellite radio band for a data package, and initiating reception of the data package at a mobile device using the determined satellite radio band.

Another aspect of the present invention provides a system for location-specific delivery of digital satellite broadcast data, comprising means for determining a current service location, means for selecting a satellite radio band based on the determination, means for monitoring the selected satellite radio band for a data package, and means for initiating reception of the data package at a mobile device using the determined satellite radio band.

A third aspect of the present invention provides a computer usable medium storing a computer program for location-specific delivery of digital satellite broadcast data, comprising computer program code for determining a current service location, computer program code for selecting a satellite radio band based on the determination, computer program code for monitoring the selected satellite radio band for a data package, and computer program code for initiating reception of the data package at a mobile device using the determined satellite radio band.

The aforementioned and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 2 is a flowchart representative of one embodiment of a method for location-specific delivery of digital satellite broadcast data in accordance with the present invention.

DETAILED DESCRIPTION OF THE PRESENTLY PREFERRED EMBODIMENTS

Figure 1:
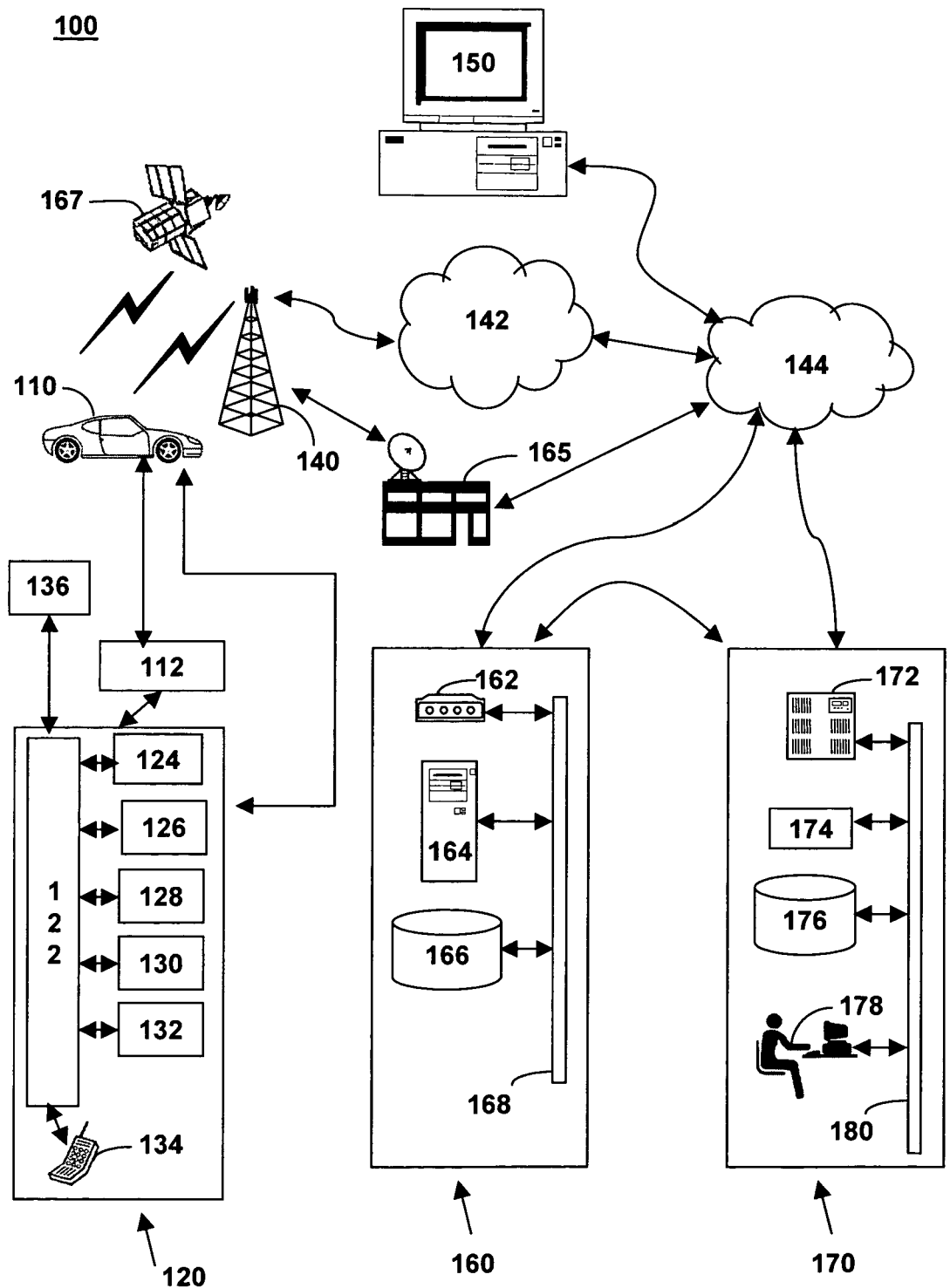
FIG. 1 is a schematic diagram of one embodiment of a system for location-specific delivery of digital satellite broadcast data in accordance with the present invention.

FIG. 1 illustrates one embodiment of a system for location-specific delivery of digital satellite broadcast data in accordance with the present invention at 100. System 100 includes a mobile vehicle communication unit (MVCU) 110; a vehicle communication network 112; a telematics unit 120; one or more wireless carrier systems 140; one or more communication networks 142; one or more land networks 144; one or more client, personal, or user computers 150; one or more web-hosting portals 160; and one or more call centers 170. In one embodiment, MVCU 110 is implemented as a mobile vehicle equipped with suitable hardware and software for transmitting and receiving voice and data communications. In an example, a display is embedded in MVCU 110. The display is a dialed digital display such as a radio unit or an instrument panel. MVCS 100 may include additional components not relevant to the present discussion. Mobile vehicle communication systems and telematics units are known in the art.

MVCU 110 is referred to as a mobile vehicle in the discussion below. In operation, MVCU 110 may be implemented as a motor vehicle, a marine vehicle, or as an aircraft. MVCU 110 may include additional components not relevant to the present discussion.

MVCU 110, via a vehicle communication network 112, sends signals to various units of equipment and systems (detailed below) within MVCU 110 to perform various functions such as unlocking a door, opening the trunk, setting personal comfort settings, and calling from telematics unit 120. In facilitating interactions among the various communication and electronic modules, vehicle communication network 112 utilizes network interfaces such as controller-area network (CAN), International Organization for Standardization (ISO) Standard 9141, ISO Standard 11898 for high-speed applications, ISO Standard 11519 for lower speed applications, and Society of Automotive Engineers (SAE) Standard J1850 for high-speed and lower speed applications.

MVCU 110, via telematics unit 120, sends and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system (GPS) unit 126, an in-vehicle memory 128, a microphone 130, one or more speakers 132, and an embedded or in-vehicle mobile phone 134. A satellite digital audio radio system (SDARS) 136 is integrated with telematics unit 120. In another embodiment the SDARS is included in telematics unit 120. In other embodiments, telematics unit 120 may be implemented without one or more of the above listed components such as, for example, speakers 132. Telematics unit 120 may include additional components not relevant to the present discussion.

In one embodiment, processor 122 is implemented as a microcontroller, microprocessor, controller, host processor, or vehicle communications processor. In an example, processor 122 is implemented as an application-specific integrated circuit (ASIC). In another embodiment, processor 122 is implemented as a processor working in conjunction with a central processing unit (CPU) performing the function of a general purpose processor. GPS unit 126 provides longitude and latitude coordinates of the vehicle responsive to a GPS broadcast signal received from one or more GPS satellite broadcast systems (not shown). In-vehicle mobile phone 134 is a cellular-type phone such as, for example, an analog, digital, dual-mode, dual-band, multi-mode or multi-band cellular phone.

Processor 122 executes various computer programs that control programming and operational modes of electronic and mechanical systems within MVCU 110. Processor 122 controls communications (e.g., call signals) between telematics unit 120, wireless carrier system 140, and call center 170. In one embodiment, a voice-recognition application is installed in processor 122 that can translate human voice input through microphone 130 to digital signals. Processor 122 generates and accepts digital signals transmitted between telematics unit 120 and a vehicle communication network 112 that is connected to various electronic modules in the vehicle. In one embodiment, these digital signals activate the programming mode and operation modes, as well as provide for data transfers.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to computer 150, web-hosting portal 160, satellite uplink facility 165, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160, satellite uplink facility 165, and call center 170.

Client, personal, or user computer 150 includes a computer usable medium to execute Internet browser and Internet-access computer programs for sending and receiving data over land network 144 and, optionally, wired or wireless communication networks 142 to web-hosting portal 160. Computer 150 sends user preferences to web-hosting portal 160 through a web-page interface using communication standards such as hypertext transport protocol (HTTP), and transport-control protocol and Internet protocol (TCP/IP). In one embodiment, the data includes directives to change certain programming and operational modes of electronic and mechanical systems within MVCU 110. In operation, a client utilizes computer 150 to initiate setting or re-setting of user preferences for MVCU 110. User-preference data from client-side software is transmitted to server-side software of web-hosting portal 160. User-preference data is stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and receives digital data from modem 162, data that is then transferred to web server 164. Modem 162 can reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends data transmissions to or receives data transmissions from one or more databases 166 via network system 168. Web server 164 includes computer applications and files for managing and storing personalization settings supplied by the client, such as door lock/unlock behavior, radio station preset selections, climate controls, custom button configurations, and theft alarm settings. For each client, the web server potentially stores hundreds of preferences for wireless vehicle communication, networking, maintenance, and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170 and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends data transmissions to or receives data transmissions from one or more communication services databases 176 via network system 180. Communication services manager 174 sends data transmissions to or receives data transmissions from one or more communication services advisors 178 via network system 180. Communication services database 176 sends data transmissions to or receives data transmissions from communication services advisor 178 via network system 180. Communication services advisor 178 receives from or sends to switch 172 voice or data transmissions.

Communication services manager 174 provides one or more of a variety of services, including enrollment services, navigation assistance, directory assistance, roadside assistance, business or residential assistance, information services assistance, emergency assistance, and communications assistance. Communication services manager 174 receives service-preference requests for a variety of services from the client via computer 150, web-hosting portal 160, and land network 144. Communication services manager 174 transmits user-preference and other data to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 can provide requested information to communication services advisor 178.

In one embodiment, communication services advisor 178 is implemented as a real advisor. In an example, a real advisor is a human being in verbal communication with a user or subscriber (e.g., a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, and communications assistance. Communication services advisor 178 communicates with telematics unit 120 in MVCU 110 through wireless carrier system 140, communication network 142, land network 144, and web-hosting portals 160 using voice transmissions. In an alternative embodiment, communication services manager 174 communicates with telematics unit 120 in MVCU 110 through wireless carrier system 140, communication network 142, land network 144, and web hosting portals 160 using voice transmissions. Switch 172 selects between voice transmissions and data transmissions.

In one embodiment, call center 170 is a data package source location. As part of a satellite broadcast system, a satellite radio uplink facility 165 sends to and receives radio signals from a geostationary satellite 167. Call center 170 sends a request to satellite uplink facility 165 to broadcast a data package and a satellite radio band selection and associated identification data. In an example, satellite radio uplink facility 165 also sends this and other radio signals to geostationary satellite 167.

Geostationary satellite 167 transmits radio signals to satellite radio receiver 136 in mobile vehicle 110. Geostationary satellite 167 broadcasts, for example, over a spectrum in the "S" band (2.3 GHz) that has been allocated by the U.S. Federal Communications Commission (FCC) for nationwide broadcasting of satellite-based Digital Audio Radio Service (DARS).

Broadcast transmissions provided by a satellite radio broadcast system are sent from geostationary satellite 167 to satellite radio receiver 136. Telematics unit 120 monitors satellite radio system broadcast signals received by satellite radio receiver 136 for identification data and an associated data package. When detected, the identification data and the data package are extracted from the broadcast channel. One example of identification data is a satellite radio subscriber identifier, which identifies the unique number assigned by the manufacturer of the satellite radio receiver and a MIN phone number that has been assigned to the in-vehicle mobile phone 134. Examples of data included in the data package are a preferred roaming list and device reprogramming instructions. Telematics unit 120 can store or retrieve data and information from the audio signals of satellite radio receiver 136.

FIG. 2 illustrates a flowchart 200 representative of one embodiment of a method for delivery of location-specific data using digital satellite broadcast in accordance with the present invention. The present invention can also take the form of a computer usable medium including a program for location-specific delivery of digital satellite broadcast data. The program stored in the computer usable medium includes computer program code for executing the method steps described in FIG. 2.

The method begins at step 201.

During step 210 a current service location is determined for a mobile device. The current service location correlates with the GPS coordinates of the mobile device at any given time. Service locations have defined geographic boundaries and are assigned a system identifier. Each wireless mobile device has an associated home system identifier.

In one embodiment of the invention, the mobile device is telematics unit 120 located in MVCU 110. Examples of other mobile devices that can receive services from a data package source location are two-way radios, cellular phones, laptop computers, personal digital assistants, and GPS units. The mobile device must have an integrated satellite radio receiver, included, for example, in satellite digital audio radio system 136, or have the capability of establishing a data connection to a satellite radio receiver to receive the data package broadcast on a satellite radio band. In addition, the mobile device must have the capability to determine GPS coordinates. The current service location is determined in reference to GPS location coordinates and can be further defined in a database located in the mobile device. In the present embodiment, the current GPS location is determined by GPS unit 126 associated with mobile device, telematics unit 120.

During step 220 a satellite radio band is selected based on the current service location. The satellite radio band is selected by referring to a latitude/longitude lookup table or a cellular network ID lookup table stored in the mobile device. The lookup table comprises a plurality of entries. Each entry associates a range of GPS locations with a particular cellular network ID or wireless service area. The cellular network IDs or wireless service areas are then associated with a particular satellite radio band transmitting data package broadcasts.

In another embodiment, the satellite radio receiver associated with the mobile device monitors a predetermined satellite radio band for identification data. In one embodiment, in which the mobile device is a telematics unit, the identification data include the MIN associated with the telematics device. In another embodiment, the identification data include a satellite digital audio radio system (SDARS) identifier corresponding to the satellite radio receiver associated with the mobile device.

The mobile device, through the satellite radio receiver, receives identification data being broadcast on the satellite radio band. When the identification data received by the mobile device are determined to correspond to identification data for that mobile device, the mobile device receives a corresponding satellite radio band selection that is broadcast along with the identification data.

During step 230, the satellite radio receiver associated with the mobile device is set to the corresponding satellite radio band, and the mobile device monitors the satellite radio band for a data package.

During step 240, the mobile device initiates reception of the data package. The ability to broadcast data over a satellite radio band allows a data package source location to transmit a particular data package to any number of mobile devices. In this way a service provider could synchronize mass data downloads to a target group of subscribers.

In one embodiment, the data package is a preferred roaming list (PRL) update. The preferred roaming list is a database in a mobile device such as a wireless phone or a telematics unit that directs it in finding and connecting to locally available wireless networks. The function of the preferred roaming list is most important when the mobile device is outside its home network and must seek out an alternate network. The PRL comprises a list of preferred networks and the order in which they should be offered to the subscriber. If a detected network is listed in this file, and the signal strength is sufficient, then that network is selected. The preferred roaming list in a mobile device must be periodically updated to account for changes in the wireless networks that the mobile device may encounter. The preferred roaming list contained in a data package updates and replaces a current preferred roaming list stored in the mobile device. Thus, the mobile device can maintain a current version of the preferred roaming list by monitoring a satellite radio band over which a preferred roaming list update is broadcast.

In another embodiment, the data package comprises a device reprogramming application. In an example, the data package includes data to modify the characteristics of a mobile device, for example as a firmware update or a subscriber identity module (SIM) card update. The device reprogramming application is computer program code that modifies parameters of the mobile device, thereby altering its operating characteristics.

Other data packages can include a phone number directory or a menu selection in a wireless Internet browser, which can be updated via a broadcast data package to provide the most current information to the user.

The data package will include an identifier or a group of identifiers specifying the mobile devices that should receive the data package. Alternatively, the data package will not include any identifier, and all mobile devices monitoring the satellite radio band over which the data package is being broadcast can receive the data package.

During step 245, the data package is received at one or more mobile devices.

During step 250, it is determined if the data package includes data management instructions. In certain cases, a mobile device requires guidance in managing data received as a broadcast data package. Data management instructions direct the mobile device in processing the received data package. During step 255, if the data package includes data management instructions, the data package is processed based on those instructions.

During step 260, a device data status is updated. The device data status is a data file that comprises information regarding the success or failure of the mobile device in receiving the data package. In one embodiment, the device data status comprises information regarding the processing of the data package based on data management instructions included with the data package. In another embodiment, the device data status includes information regarding the success or failure of a device reprogramming application and the progress of the application in performing its designated task.

During step 265, it is determined if a data acknowledgment trigger was included with the data package. A data acknowledgment trigger instructs the mobile device to send the device data status to the data package source location upon the occurrence of some trigger event. If the data package includes a data acknowledgment trigger, transmission of the device data status from the mobile device to the data package source location is initiated during step 270 based on the conditions defined in the data acknowledgment trigger. Those conditions include sending the device data status upon receipt of the data package, upon success or failure of any data management instructions, upon arrival of the mobile device at a predetermined location, or at a specific time. If a data acknowledgment trigger is not included with the data package, then transmission of the device data status will occur upon receipt of the data package by the mobile device, or transmission will be initiated upon request by a service advisor at the data package source location.

During step 280, the device data status is transmitted from the mobile device to the data package source location. In one embodiment, a telematics unit transmits the device data status to a telematics call center over the cellular networks by placing a wireless call to the telematics call center. In another embodiment, the mobile device communicates with the data package source location via landline or Internet transmissions. In yet another embodiment, no device data status is transmitted from the mobile device. A data package source location, such as a telematics data center, can limit data traffic by restricting transmission of the device data status when it is neither necessary nor desired.

At step 295, the method ends.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method for location-specific delivery of digital satellite broadcast data comprising:
    determining a current service location;
    selecting a satellite radio band responsive to the determination;
    monitoring the selected satellite radio band for a data package; and
    initiating reception of the data package at a mobile device using the determined satellite radio band.

2. The method of claim 1 wherein selecting a satellite radio band further comprises:
    monitoring a predetermined satellite radio band at the mobile device;
    receiving an identification data broadcast on the predetermined satellite radio band;
    determining corresponding identification data; and
    receiving a satellite radio band selection based on the determination.

3. The method of claim 1 further comprising:
    receiving the data package on the satellite radio band at at least one mobile device;
    updating a device data status based on the data package verification; and
    transmitting the device data status from the mobile device to a data package source location.

4. The method of claim 1 further comprising:
    receiving data management instructions with the data package; and
    processing the data package at the mobile device based on the data management instructions.

5. The method of claim 1 further comprising:
    receiving a data acknowledgment trigger with the data package; and
    initiating the transmission of the device status from the mobile device to the data package source location based on the received data acknowledgment trigger.

6. The method of claim 1 wherein the data package comprises a device reprogramming application.

7. The method of claim 1 wherein the data package comprises a preferred roaming list update.

8. A system for location-specific delivery of digital satellite broadcast data comprising:
    means for determining a current service location;
    means for selecting a satellite radio band responsive to the determination;
    means for monitoring the selected satellite radio band for a data package; and
    means for initiating reception of the data package at a mobile device using the determined satellite radio band.

9. The system of claim 8 wherein means for selecting a satellite radio band further comprises:
    means for monitoring a predetermined satellite radio band at the mobile device;
    means for receiving an identification data broadcast on the predetermined satellite radio band;
    means for determining corresponding identification data; and
    means for receiving a satellite radio band selection based on the determination.

10. The system of claim 8 further comprising:
    means for receiving the data package on the satellite radio band at at least one mobile device;
    means for updating a device data status based on the data package verification; and
    means for transmitting the device data status from the mobile device to a data package source location.

11. The system of claim 8 further comprising:
    means for receiving data management instructions with the data package; and
    means for processing the data package at the mobile device based on the data management instructions.

12. The system of claim 8 further comprising:
    means for receiving a data acknowledgment trigger with the data package; and
    means for initiating the transmission of the device status from the mobile device to the data package source location based on the received data acknowledgment trigger.

13. The system of claim 8 wherein the data package comprises a preferred roaming list update.

14. A computer usable medium storing a computer program for location-specific delivery of digital satellite broadcast data, comprising:
    computer program code for determining a current service location;
    computer program code for selecting a satellite radio band responsive to the determination;
    computer program code for monitoring the selected satellite radio band for a data package; and
    computer program code for initiating reception of the data package at a mobile device using the determined satellite radio band.

15. The computer usable medium of claim 14 wherein selecting a satellite radio band further comprises:
    computer program code for monitoring a predetermined satellite radio band at the mobile device;
    computer program code for receiving an identification data broadcast on the predetermined satellite radio band;
    computer program code for determining corresponding identification data; and
    computer program code for receiving a satellite radio band selection based on the determination.

16. The computer usable medium of claim 14 further comprising:
    computer program code for receiving the data package on the satellite radio band at at least one mobile device;
    computer program code for updating a device data status based on the data package verification; and
    computer program code for transmitting the device data status from the mobile device to a data package source location.

17. The computer usable medium of claim 14 further comprising:
    computer program code for receiving data management instructions with the data package; and
    computer program code for processing the data package at the mobile device based on the data management instructions.

18. The computer usable medium of claim 14 further comprising:
  computer program code for receiving a data acknowledgment trigger with the data package; and
  computer program code for initiating the transmission of the device status from the mobile device to the data package source location based on the received data acknowledgment trigger.

19. The computer usable medium of claim 14 wherein the data package comprises a device reprogramming application.

20. The computer usable medium of claim 14 wherein the data package comprises a preferred roaming list update.

* * * * *